United States Patent
Yu et al.

(10) Patent No.: US 11,052,751 B2
(45) Date of Patent: Jul. 6, 2021

(54) COAXIAL MULTI-MOTOR DRIVE SYSTEM AND VEHICLE PROVIDED WITH SAME

(71) Applicant: Jing-Jin Electric Technologies Co., Ltd., Beijing (CN)

(72) Inventors: Ping Yu, Beijing (CN); Zifu Wang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/349,723

(22) PCT Filed: Jan. 20, 2017

(86) PCT No.: PCT/CN2017/071844
§ 371 (c)(1),
(2) Date: May 14, 2019

(87) PCT Pub. No.: WO2018/090485
PCT Pub. Date: May 24, 2018

(65) Prior Publication Data
US 2019/0322166 A1  Oct. 24, 2019

(30) Foreign Application Priority Data
Nov. 18, 2016 (CN) .......................... 201611016856.3

(51) Int. Cl.
*B60K 7/00* (2006.01)
*B60K 1/02* (2006.01)
*B60K 17/04* (2006.01)

(52) U.S. Cl.
CPC .............. *B60K 7/0015* (2013.01); *B60K 1/02* (2013.01); *B60K 17/043* (2013.01); *B60K 2007/0046* (2013.01); *B60K 2007/0092* (2013.01)

(58) Field of Classification Search
CPC . B60K 1/02; B60K 17/043; B60K 2007/0092
See application file for complete search history.

(56) References Cited

U.S. PATENT DOCUMENTS 3,161,083 A * 12/1964 Roe .......................... B60K 6/52
                                                        475/5
4,663,581 A *  5/1987 Glennon ................ H02K 16/00
                                                       310/114
(Continued)

FOREIGN PATENT DOCUMENTS

CN        202641339 U       1/2013
CN        104617707 A       5/2015
(Continued)

OTHER PUBLICATIONS

Supplemental European Search Report issued in EP 17871577 dated Sep. 18, 2019.
(Continued)

Primary Examiner — Brian L Swenson
(74) Attorney, Agent, or Firm — Fox Rothschild LLP; Carol E. Thorstad-Forsyth

(57) ABSTRACT

A coaxial propulsion system is provided, which comprises a housing, and two or more electric motors provided in the housing, wherein the electric motors share one common shaft. At least one of the two or more electric motors is a permanent-magnet synchronous motor, an asynchronous motor or a switched reluctance motor, and of different efficiency maps. The system can improve the power density and system efficiency of propulsion system while maintaining high performance output, to enhance the integration level, and reduce size, weight and cost.

16 Claims, 2 Drawing Sheets

(56) References Cited

U.S. PATENT DOCUMENTS

| | | | |
|---|---|---|---|
| 5,229,676 A | | 7/1993 | Bood |
| 5,708,314 A | * | 1/1998 | Law .......................... F16H 3/10 |
| | | | 310/103 |
| 5,823,280 A | | 10/1998 | Lateur et al. |
| 5,829,542 A | * | 11/1998 | Lutz .......................... B60K 1/02 |
| | | | 180/65.6 |
| 6,743,135 B2 | * | 6/2004 | Klemen ................. B60K 6/365 |
| | | | 475/5 |
| 7,455,132 B2 | | 11/2008 | Acharya et al. |
| 8,967,303 B2 | * | 3/2015 | Smetana ................. B62D 7/04 |
| | | | 180/6.2 |
| 9,580,065 B2 | * | 2/2017 | Bangura ............... B60W 20/13 |
| 2003/0019674 A1 | | 1/2003 | Duan |
| 2011/0259657 A1 | * | 10/2011 | Fuechtner ................ B60K 6/52 |
| | | | 180/65.21 |
| 2014/0024490 A1 | | 1/2014 | Bangura et al. |
| 2014/0045648 A1 | * | 2/2014 | Bangura ................ B60K 6/365 |
| | | | 477/3 |
| 2016/0036308 A1 | * | 2/2016 | Bailey ..................... B60K 6/26 |
| | | | 290/45 |
| 2016/0075257 A1 | * | 3/2016 | Wein ..................... B60W 30/18 |
| | | | 180/65.7 |
| 2017/0149303 A1 | * | 5/2017 | Urch ........................ B60K 6/30 |
| 2019/0061504 A1 | * | 2/2019 | Bassis .................. B60K 17/354 |

FOREIGN PATENT DOCUMENTS

| | | |
|---|---|---|
| CN | 204506463 U | 7/2015 |
| CN | 104875594 A | 9/2015 |
| CN | 205489959 U | 8/2016 |
| DE | 2847181 A1 | 5/1980 |
| DE | 202009014490 U1 | 2/2010 |
| DE | 102010031490 A1 | 1/2012 |
| DE | 102013005721 A1 | 10/2014 |
| GB | 2351794 A | 1/2001 |
| IT | MI20030753 A1 | 11/2003 |
| JP | 2005354886 A | 12/2005 |
| WO | 2015140334 A1 | 9/2015 |

OTHER PUBLICATIONS

Communication Pursuant to Article 94(3) EPC issued in EP 17871577.7 dated Jul. 15, 2020.

* cited by examiner

сOAXIAL MULTI-MOTOR DRIVE SYSTEM AND VEHICLE PROVIDED WITH SAME

RELATED APPLICATION DATA

The present application is the U.S. National Phase of International Patent Application No. PCT/CN2017/071844, filed on Jan. 20, 2017 and entitled "COAXIAL MULTI-MOTOR DRIVE SYSTEM AND VEHICLE PROVIDED WITH SAME," which claims priority to Chinese Patent Application No. CN 201611016856.3, filed on Nov. 18, 2016 and entitled "COAXIAL MULTI-MOTOR DRIVE SYSTEM AND VEHICLE PROVIDED WITH SAME," the contents of which are incorporated herein by reference in their entireties.

TECHNICAL FIELD

The present disclosure relates to a coaxial driving system with multiple electric motors, which comprises two or more electric motors, and is used for electric vehicles and hybrid electric vehicles. The present disclosure further relates to a vehicle provided with the coaxial propulsion system with multiple electric motors.

BACKGROUND

In any solutions of powertrain electrification or hybridization, electric motor is used to directly or indirectly drive a vehicle. Because efficiency of electric motors is typically higher than that of internal combustion engines, hybrid vehicles can achieve a higher system efficiency, thereby, compared with conventional internal combustion engine vehicles, saves fuel consumption, and reduces exhaust emissions. Moreover, in battery electric vehicles, electric motor is a crucial part of the driving system, because the performance and efficiency of entire driving system are directly determined by the electric motor. Besides driving the vehicle to advance or reverse, traction electric motor also has the function of regenerative braking, that is, in braking, converting and storing the kinetic energy of the vehicle into electrical energy, rather than losing such energy as heat.

Usually, the electric motors employed in a driving system are permanent-magnet synchronous motors or asynchronous motors. As limited by electrical power and electronic devices such as battery and power inverter, the performance output of traction motors in the vehicle is limited. Such limitation will apply to different aspects such as output torque, maximum power and flux weakening control at high speeds. Therefore, on high-performance vehicles where high-torque and high-power is required, frequently two or more driving electric motors are used.

When a vehicle has two or more traction electric motors, system architecture is of vital importance. Taking two electric motors as the example, when the two electric motors are respectively arranged at the front and rear drive shafts of a vehicle, or respectively arranged at the left and right wheels of the same one drive shaft, the master control unit must maintain coordination of their speeds and torques, to ensure overall stability and maneuverability of vehicle. On the other hand, when the two electric motors are arranged closely at same location, the volume of the two stacked electric motors tends to bring difficulty in system packaging, and the stacked weight may affect the balance of vehicle. In another aspect, the selection of electric motor topology is also critical. If both of the electric motors are permanent-magnet synchronous motors, because of the requirement on flux weakening, the overall system efficiency suffers at high speeds.

SUMMARY

In view of the above problems, the present disclosure provides a coaxial propulsion system with multiple electric motors, which can improve the power density and system efficiency of the driving system while maintaining high performance output, to enhance the integration level, and reduce size, weight and cost.

The coaxial propulsion system with multiple electric motors comprises a housing and two or more electric motors being provided in the housing, wherein the electric motors share one common shaft.

Optionally, the electric motor is a permanent-magnet synchronous motor, an asynchronous motor or a switched reluctance motor, and efficiency maps of the electric motors are different.

Optionally, the electric motors are two electric motors that are a permanent-magnet synchronous motor and an asynchronous motor, or are a permanent-magnet synchronous motor and a switched reluctance motor.

Optionally, the electric motor is radial-magnetic-field electric motor or axial-magnetic-field electric motor.

Optionally, the housing is provided therein with receiving chambers of a quantity equal to a quantity of the electric motors, and an intervening supporter is provided between two adjacent receiving chambers.

Optionally, the main shaft is provided with a bearing at each of two ends, and is provided with a bearing in a middle portion, and the bearing in the middle portion is provided on the intervening supporter.

Optionally, the electric motors share a cooling system.

Optionally, rotational speeds of the electric motors are the same.

A vehicle provided with a coaxial propulsion system with multiple electric motors, wherein the vehicle is provided with the above-described coaxial propulsion system with multiple electric motors.

Optionally, the vehicle comprises a drivetrain combining a differential and the coaxial propulsion system with multiple electric motors. The output end of the main shaft of the coaxial propulsion system with multiple electric motors is connected to the differential and a speed reducer or gearbox can be provided between the output of the coaxial propulsion system with multiple electric motors and the differential.

Optionally, the vehicle comprises a plurality of said coaxial propulsion systems with multiple electric motors, separately coupled to different wheels. An output end of the main shaft of the coaxial propulsion system with multiple electric motors is connected to the axle, and a speed reducer or gearbox can be provided between the output end of the main shaft and the axle.

In conclusion, the present disclosure has the following advantages:

The two or more electric motors of the present disclosure can simultaneously operate, to together provide an output of high torque and high power. They may also not operate simultaneously, but instead merely one of the electric motors is operating, to achieve the optimum efficiency.

The two or more electric motors of the present disclosure have different efficiency maps. Therefore, under the requirements on a specific speed and torque, the electric motor with the better efficiency may be selected by using a computer program to perform the main outputting, thereby improving the overall efficiency.

The asynchronous motor and switched reluctance motor of the present disclosure do not have requirement on flux weakening at high speeds, so do not have an additional loss at high speeds.

In the present disclosure the driving system is arranged on the differential of the drive shaft, and the speed reducer or gearbox is added, the system of which has the functions of vehicle driving and regenerative braking.

The above description is only an overview of the technical solutions of the present disclosure. In order to understand the technical means of the present disclosure more clearly, and to implement them according to the contents of the description, and in order to make the above and other objects, features and advantages of the present disclosure more fully understood, the particular embodiments of the present disclosure are provided below.

BRIEF DESCRIPTION OF DRAWINGS

By reading the detailed description of the preferable embodiments below, various other advantages and benefits will become clear to a person skilled in the art. The drawings are only for the purpose of illustrating the preferable embodiments, and are not considered as limitation to the present disclosure. Furthermore, throughout the drawings, the same reference signs denote the same elements. In the drawings.

Figure 1:
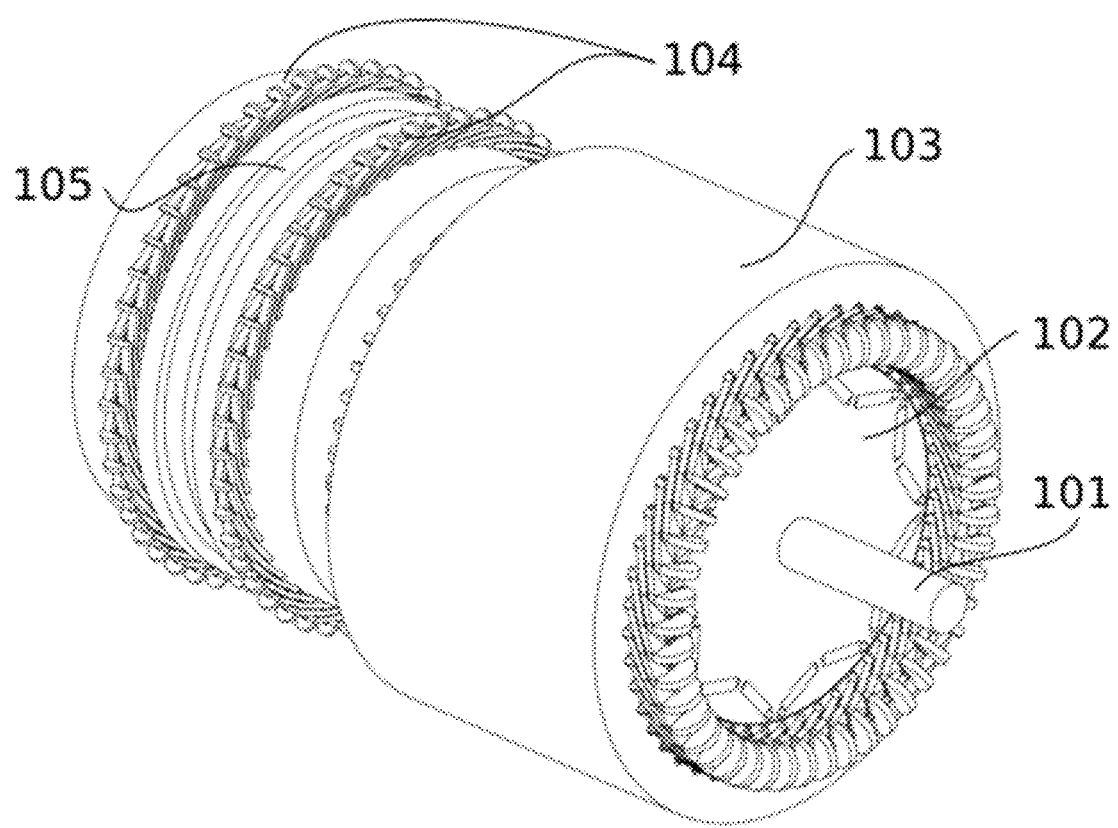
FIG. 1 is a perspective view of the first embodiment of the present disclosure.

In the drawings: 101. main shaft; 102. rotor; 103. stator; 104. stator; 105. rotor; 111. housing; 112. bearing; 121. coaxial propulsion system with multiple electric motors; 122. transmission part; 123. drive shaft; 124. wheel; and 131. transmission part.

DETAILED DESCRIPTION

The exemplary embodiments of the present disclosure will be described in further detail below by referring to the drawings. Although the drawings illustrate the exemplary embodiments of the present disclosure, it should be understood that, the present disclosure can be implemented in various forms, which should not be limited by the embodiments illustrated herein. In contrast, the purpose of providing those embodiments is to more clearly understand the present disclosure, and to completely convey the scope of the present disclosure to a person skilled in the art.

First Embodiment

Figure 2:
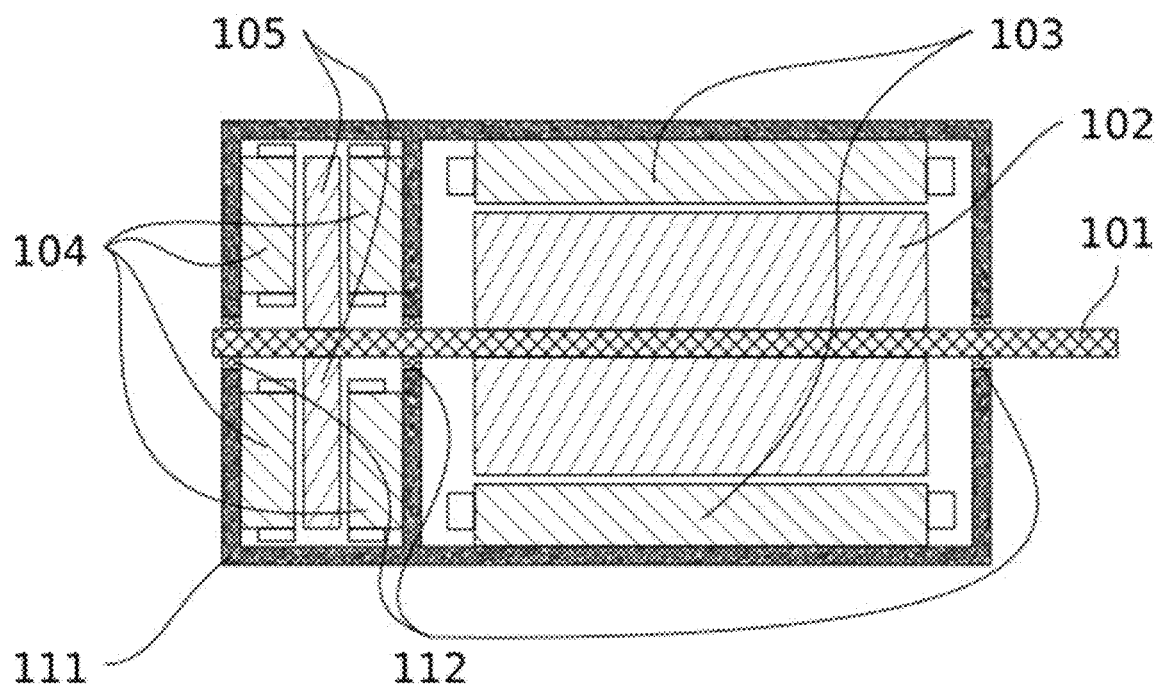
FIG. 2 is a sectional view of the first embodiment of the present disclosure.

FIGS. 1 and 2 show one of the embodiments of the present disclosure. In this embodiment, the coaxial propulsion system with multiple electric motors comprises a housing 111, two or more electric motors are provided in the housing 111, and the electric motors share one main shaft 101. Those electric motors may operate simultaneously, and one of the electric motors may also selectively operate individually.

The electric motor may be a permanent-magnet synchronous motor, an asynchronous motor or a switched reluctance motor. The efficiency maps (reflecting the distribution of the electric motor efficiency at different rotational speeds and torques) of those electric motors are different, but when simultaneously operating, the rotational speeds of those electric motors are the same.

The permanent-magnet synchronous motor has permanent magnets attached to the surface of the rotor core, or embedded with the rotor core. The asynchronous motor is provided with a squirrel cage conductor in the rotor core. Moreover, the switched reluctance motor merely has a core in the rotor.

In this embodiment, the electric motors are two electric motors that are a permanent-magnet synchronous motor and an asynchronous motor, or a permanent-magnet synchronous motor and a switched reluctance motor.

The electric motors can have either radial magnetic field or axial magnetic field.

The axial-magnetic-field electric motor is formed by annular stator and annular rotor, the areas of the stator core and the rotor core that oppose nearly match in size, an air gap exist therebetween, and they interact by magnetic field.

As shown in FIG. 2, the housing 111 is provided therein with receiving chambers of the quantity equal to the quantity of the electric motors, and an intervening supporter is provided between two adjacent receiving chambers. The supporter may be a supporting plate or a supporting bracket.

The main shaft is provided with a bearing at each of two ends, and is provided with a bearing in a middle portion, and the bearing in the middle portion is provided on the intervening supporter.

Because all electric motors are provided in the housing 111, those electric motors can share a cooling system, which saves space. Certainly, those electric motors may also employ individually independent cooling systems.

Referring to FIG. 1, here, by using one radial-magnetic-field permanent-magnet synchronous motor and one axial-magnetic-field asynchronous motor as the example, the method of constructing the driving system is illustrated in a perspective view. In the figure, the main shaft 101 is the rotating shaft that the two electric motors share, and is also the output end of the driving system. The rotor 102 of the radial-magnetic-field permanent-magnet synchronous motor is fixed to the main shaft 101. The stator 103 of the permanent-magnet synchronous motor is arranged at the outer ring of the rotor 102. The stator 104 of the axial-magnetic-field asynchronous motor is formed by two pieces, which sandwich the rotor 105 of the axial-magnetic-field asynchronous motor therebetween. The rotor 105 of the axial-magnetic-field asynchronous motor is also fixed to the main shaft 101.

Referring to FIG. 2, the method of constructing the driving system is illustrated in a sectional view. Compared with FIG. 1, in FIG. 2 further exhibited are the arrangement of the housing 111 and a bearing 112. Here, it can be seen that the stator 103 of the permanent-magnet synchronous motor and the stator 104 of the axial-magnetic-field asynchronous motor are together assembled on the housing 111. The housing 111 may be integrally manufactured, and may also be formed by connecting a plurality of portions. The target is to enable the two electric motors to share a cooling device, thereby improving the integration level of the system. The rotor 102 of the radial-magnetic-field permanent-magnet synchronous motor and the rotor 105 of the axialmagnetic-field asynchronous motor are together fixed to the main shaft 101, and are supported on the housing 111 by the bearing 112.

Second Embodiment

In this embodiment, as different from the first embodiment, the electric motors are three electric motors that are a permanent-magnet synchronous motor, an asynchronous motor and a permanent-magnet synchronous motor, or are a permanent-magnet synchronous motor, a switched reluctance motor and a permanent-magnet synchronous motor.

Third Embodiment

Figure 3:
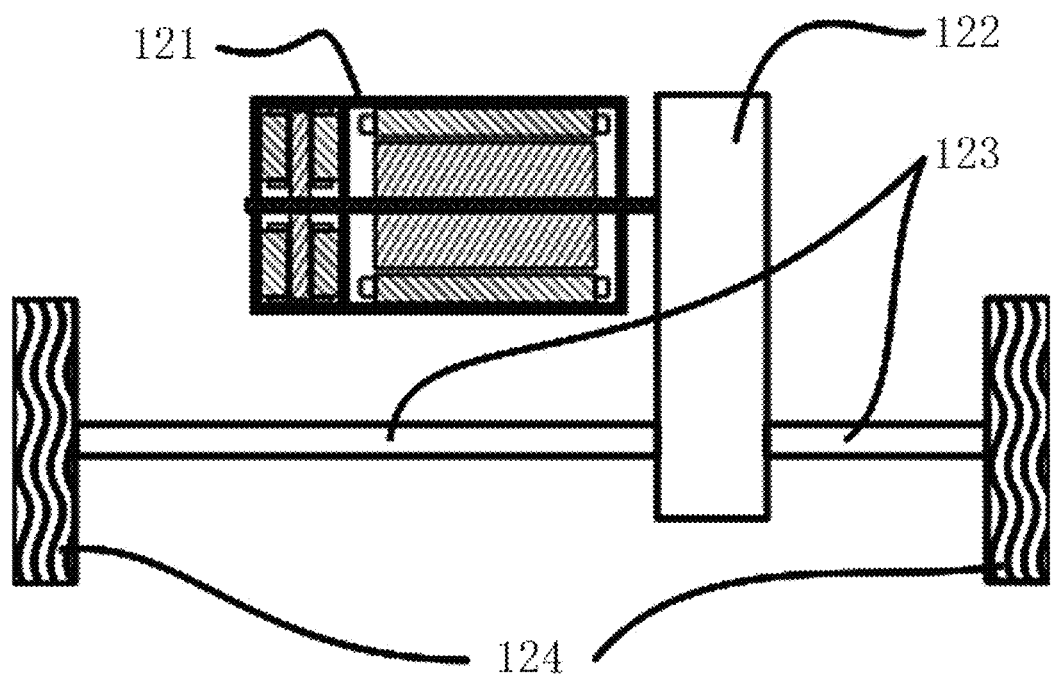
FIG. 3 is a structural view of the third embodiment of the present disclosure.

As shown in FIG. 3, in this embodiment, a vehicle provided with the coaxial propulsion system with multiple electric motors in the first embodiment is provided. The vehicle comprises a drive shaft 123, the drive shaft 123 is provided with a wheel 124 at each of two ends, a transmission part 122 is provided between the drive shaft 123 and the coaxial propulsion system with multiple electric motors 121, the transmission part 122 is provided therein with a differential (not shown in the figure, and blocked by the transmission part 122), the output end of the main shaft of the coaxial propulsion system with multiple electric motors 121 is connected to the differential 122, and the differential 122 is provided on the drive shaft 123.

A speed reducer or gearbox may be provided in the transmission part 122, and the speed reducer or gearbox is provided between the output end of the main shaft and the differential 122.

The coaxial propulsion system with multiple electric motors may be applied to a vehicle front axle, and may also be applied to a vehicle rear axle.

Fourth Embodiment

Figure 4:
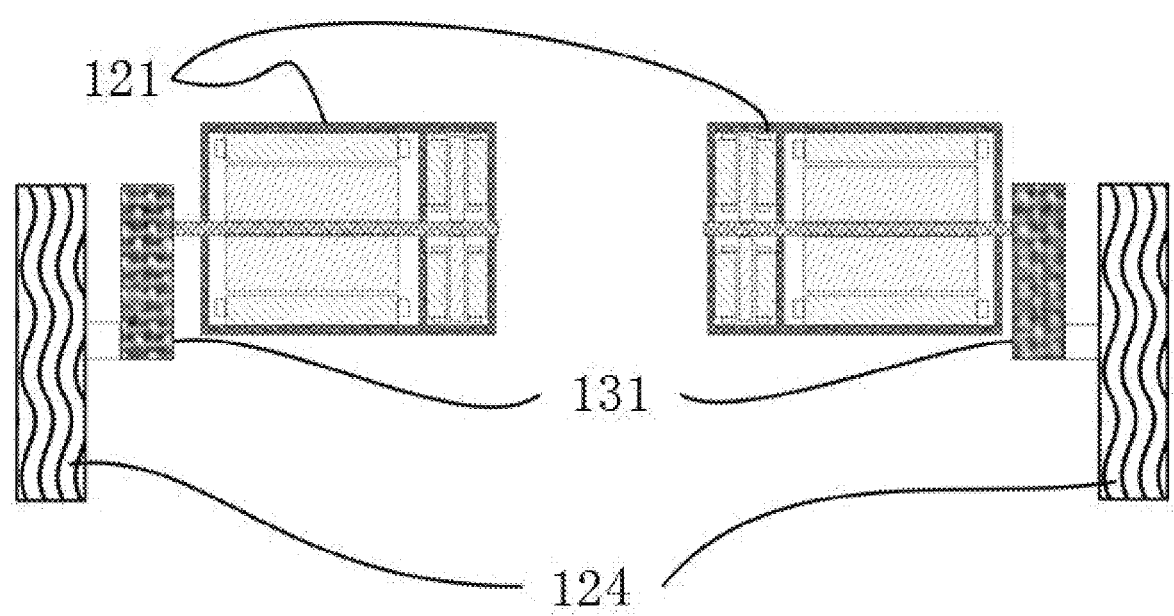
FIG. 4 is a structural view of the fourth embodiment of the present disclosure.

As shown in FIG. 4, in this embodiment, a vehicle provided with the coaxial propulsion system with multiple electric motors in the first embodiment is provided. Each of the two driving wheels 124 has an independent axle, each of the two driving wheels 124 has a corresponding coaxial propulsion system with multiple electric motors 121, a transmission part 131 is provided between the coaxial propulsion system with multiple electric motors 121 and the axle of the corresponding driving wheel 124, and a speed reducer or transmission may be provided in the transmission part 131.

The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

What is claimed is:

1. A coaxial propulsion system with multiple electric motors, comprising a housing, two or more electric motors being provided in the housing, wherein the electric motors share one main shaft, efficiency maps of the electric motors are different, and the electric motor with a better efficiency is selected under the requirements on a specific speed and torque, wherein the electric motors include at least a radial field motor and an axial field motor.

2. The coaxial propulsion system with multiple electric motors according to claim 1, wherein the electric motors are selected from a permanent-magnet synchronous motor, an asynchronous motor or a switched reluctance motor.

3. The coaxial propulsion system with multiple electric motors according to claim 2, wherein the electric motors are two electric motors that are a permanent-magnet synchronous motor and an asynchronous motor, or are a permanent-magnet synchronous motor and a switched reluctance motor.

4. A vehicle provided with a coaxial propulsion system with multiple electric motors, wherein the vehicle is provided with the coaxial propulsion system with multiple electric motors according to claim 3.

5. A vehicle provided with a coaxial propulsion system with multiple electric motors, wherein the vehicle is provided with the coaxial propulsion system with multiple electric motors according to claim 2.

6. The coaxial propulsion system with multiple electric motors according to claim 1, wherein the housing is provided therein with receiving chambers of a quantity equal to a quantity of the electric motors, and an intervening supporter is provided between adjacent two receiving chambers.

7. The coaxial propulsion system with multiple electric motors according to claim 6, wherein the main shaft is provided with a bearing at each of two ends, and is provided with a bearing in a middle portion, and the bearing in the middle portion is provided on the intervening supporter.

8. A vehicle provided with a coaxial propulsion system with multiple electric motors, wherein the vehicle is provided with the coaxial propulsion system with multiple electric motors according to claim 7.

9. The coaxial propulsion system with multiple electric motors according to claim 6, wherein the electric motors share a cooling system.

10. A vehicle provided with a coaxial propulsion system with multiple electric motors, wherein the vehicle is provided with the coaxial propulsion system with multiple electric motors according to claim 9.

11. A vehicle provided with a coaxial propulsion system with multiple electric motors, wherein the vehicle is provided with the coaxial propulsion system with multiple electric motors according to claim 6.

12. The coaxial propulsion system with multiple electric motors according to claim 1, wherein rotational speeds of the electric motors are the same.

13. A vehicle provided with a coaxial propulsion system with multiple electric motors, wherein the vehicle is provided with the coaxial propulsion system with multiple electric motors according to claim 12.

14. A vehicle provided with a coaxial propulsion system with multiple electric motors, wherein the vehicle is provided with the coaxial propulsion system with multiple electric motors according to claim 1.

15. The vehicle according to claim 14, wherein the vehicle comprises a drive shaft, the drive shaft is provided with a wheel at each of two ends, the drive shaft is provided with a differential in a middle portion, the coaxial propulsion system with multiple electric motors is one coaxial propulsion system with multiple electric motors, an output end of the main shaft of the coaxial propulsion system with multiple electric motors is connected to the differential, and a speed reducer or gearbox is provided between the output end of the main shaft and the differential.

16. The vehicle according to claim 14, wherein the vehicle comprises a plurality of wheels, each of the wheels has an independent axle, each of the wheels is provided with one said coaxial propulsion system with multiple electric motors, an output end of the main shaft of the coaxial propulsion system with multiple electric motors is connected to the axle, and a speed reducer or gearbox is provided between the output end of the main shaft and the axle.

* * * * *